D. S. LANDSTRA.
VEHICLE LICENSE SIGN.
APPLICATION FILED SEPT. 4, 1920.
1,404,868.
Patented Jan. 31, 1922.
2 SHEETS—SHEET 1.
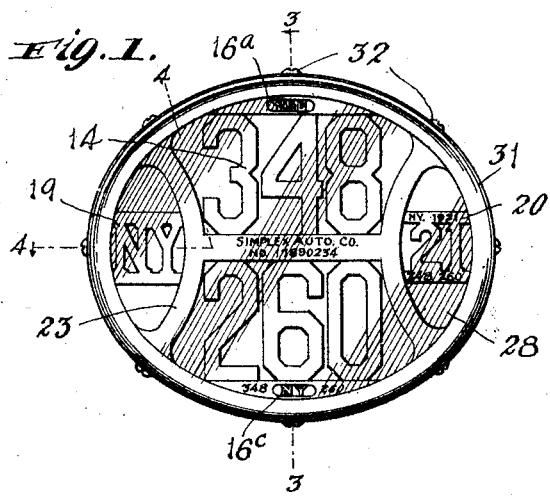
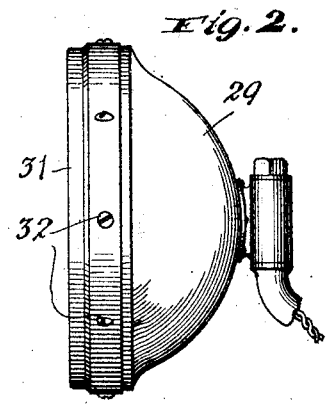
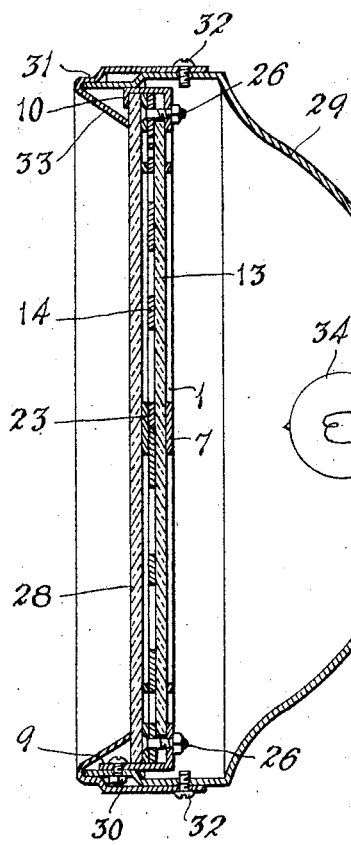
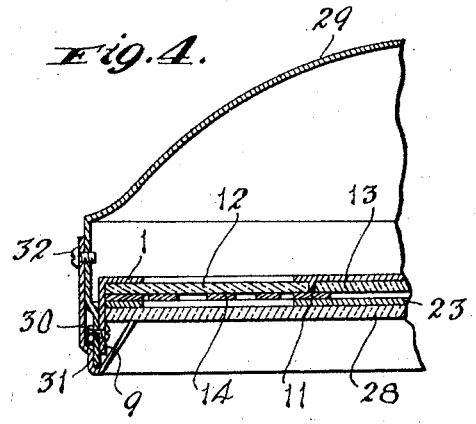
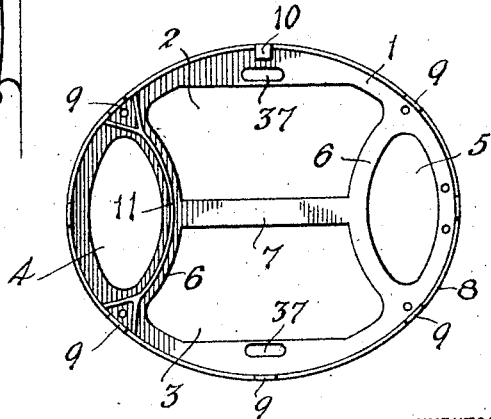
INVENTOR
Dirk S. Landstra,
BY
Everett H. Rook.
ATTORNEYS.

D. S. LANDSTRA.
VEHICLE LICENSE SIGN.
APPLICATION FILED SEPT. 4, 1920.

1,404,868.

Patented Jan. 31, 1922.

INVENTOR
Dirk S. Landstra,
BY Everett & Rook
ATTORNEYS.

UNITED STATES PATENT OFFICE.

DIRK S. LANDSTRA, OF SOUTH ORANGE, NEW JERSEY.

VEHICLE LICENSE SIGN.

1,404,868.     Specification of Letters Patent.     Patented Jan. 31, 1922.

Application filed September 4, 1920. Serial No. 408,188.

*To all whom it may concern:*

Be it known that I, DIRK S. LANDSTRA, a citizen of the United States, and a resident of South Orange, in the county of Essex and State of New Jersey, have invented new and useful Improvements in Vehicle License Signs, of which the following is a specification.

This invention relates to a vehicle license sign which is plainly visible both day and night, one object of the invention being to provide such a license sign wherein unauthorized or malicious changing of the license numbers is prevented thus reducing the possibility of theft of the vehicle to which the sign is attached, reckless driving, and other unlawful acts, and making detection in such cases less difficult.

Further objects of the invention are to provide a license sign of the character described bearing an easily removable and changeable year designation whereby the same license number may be utilized for a number of years by the mere changing of the year designation as the years pass, for instance, from 1920 to 1921, etc.; to provide a license sign in which the numbers are mounted in a casing so that the casing must be entirely disassembled to remove or change all of the numbers; to provide such a license sign having the license number divided into a plurality of sections, that is, one or more of the figures comprising the number being separable from the remaining figures, at least one of said figures being permanently fixed with respect to the license sign and improved means for mounting said number sections, whereby a complete unauthorized change of the license number is rendered extremely difficult; to provide a novel combination of said license sign with a tail light for a vehicle whereby the license sign is illuminated and plainly visible in the dark; to provide such a device which is simple and inexpensive in construction and operation, and to obtain other results and advantages as may be brought out by the following description.

Referring to the accompanying drawings, in which like numerals of reference indicate the same parts throughout the several views, Figure 1 is a front elevation of a license sign embodying my invention showing the same applied to an automobile tail light;

Figure 2 is a side elevation thereof;

Figure 3 is an enlarged transverse vertical sectional view taken on the line 3—3 of Fig. 1;

Figure 4 is a horizontal sectional view taken on the line 4—4 of Fig. 1;

Figure 5 is a front elevation of the rear number supporting frame plate;

Figure 6:
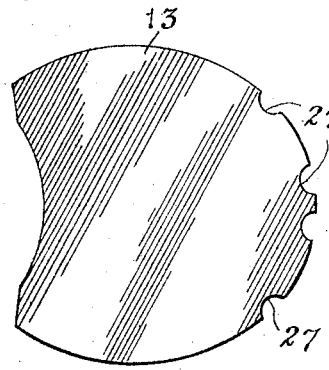
Figure 6 is a plan view of the clear section of the rear glass.
Figure 8:
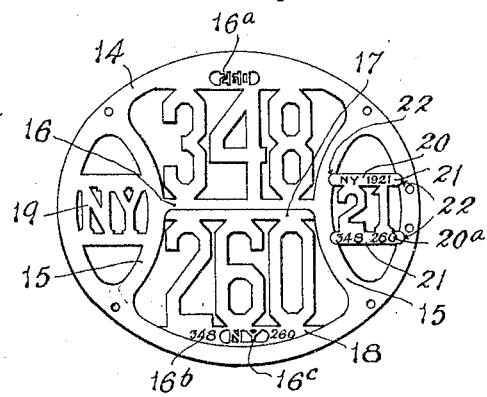
Figure 8 is a front elevation of the license number carrying frame.
Figures 9, 10:
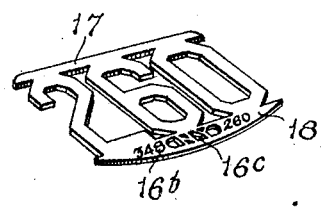
Figure 9 is a detached perspective view of the removable section of the license number.
Figure 10 is a similar view of the year designation member.
Figures 7, 11:
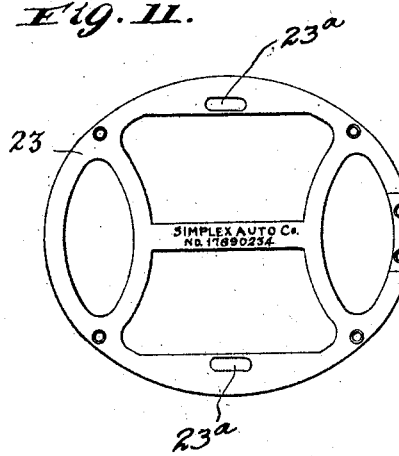
Figure 7 is a similar view of the red section of the rear glass.
Figure 11 is a front elevation of the front plate of the number supporting frame.

In the embodiment of my invention illustrated in Figures 1–12 inclusive of the drawing, the numeral 1 designates the rear plate of the number supporting frame which in the present instance is shown as elliptical in shape, but which may be made of any desired configuration. This plate is shown as formed of sheet metal and is provided with upper and lower openings 2 and 3, and end openings 4 and 5, the said openings being formed by end cross bars 6 and a central longitudinal bar 7 connecting the end cross bars 6. The plate 1 is provided with a peripheral outstanding flange 8 which is provided at spaced points with extensions or tongues 9, the tongue 9 at the upper side of the plate having its outer extremity bent at substantially right angles as at 10. One of the cross bars 6 is provided with an upstanding rib 11 connected with the peripheral flange 8 of the plate, the said rib 11 and the portion of the flange 8 between the ends thereof receiving a substantially elliptical piece of red glass 12. A section of clear glass 13 is mounted within the remaining portion of the plate 1 and is held against lateral movement therein by the flange 8 and rib 11.

A license number plate 14 having a configuration substantially the same as that of the plate 1 is mounted within the said plate 1 upon the glasses 12 and 13. This number plate 14 may be formed of any suitable material, preferably enameled sheet metal or pyralin, and is provided with end cross bars 15 of substantially the same size and shape as the cross bars 6 of the plate 1, a central longitudinal bar 16 being also formed in the number plate. The license number is divided into a plurality of sections, one of which is fixed with respect to the plate 14, while the other is removable therefrom. In the present instance, the license number comprises six figures, the figures "348" designating the thousands being stamped integrally with the plate 14 between the central bar 16 and the upper side of the plate, and comprising the upper section of the number. The other section of the number, "260," is removably mounted in the lower portion of the plate 14, the said section comprising an upper cross bar 17 which is adapted to snugly engage the bar 16 of the plate, and a lower curved bar 18 which is adapted to fit the curved lower side of the plate, the said section being held in position by frictional engagement. The two sections of the number are preferably identified with each other whereby one section cannot be used with a section of another number without detection. In the present instance the section "348" is identified with the other section by the stamping of the figures comprising the other section, as at 16$^a$, in the plate 14, while the whole number is suitably inscribed upon the section "260" of the license number, as at 16$^b$. The removable section of the number is also preferably identified with the State of issue of the number by the stamping of the name of the State thereon as at 16$^c$. Between one of the cross bars and the corresponding end of the plate 14 is permanently arranged the name 19 of the State of issue of the license number, while between the other cross bar 15 and the corresponding end of the frame is removably mounted the year designation member 20. This member preferably comprises upper and lower cross bars 21 between which the figures designating the year are arranged, the ends of the cross bars 21 being received in corresponding notches 22 formed in the cross bar 15 and the end of the frame, the said member 20 being held in the plate 14 by frictional engagement similar to the lower section of the license number.

An outer plate 23 of the number supporting frame is arranged upon the number plate 14, the said plate 23 being substantially identical in shape with the plate 1, with the exception that no peripheral flange or upstanding rib is provided thereon. The end of the plate 23 which overlies the year designation member 21 has a section 24 thereof removable, the said section being secured to the plate 1 by screws 25 as more clearly shown in Figure 12. The section 24 is of a length substantially equal to the width of the year designation member 21. The outer frame plate 23 is secured to the rear plate 1 by a plurality of bolts 26 which have the heads thereof countersunk in the plate 23 with the nuts at the rear of the plate 1, the said bolts passing through the respective frame plates and the number plate 14. The rear glass 13 is notched as at 27 to clear the said bolts 26. A front glass 28 is arranged over the front frame plate 23, the said glass being substantially the same shape as the plates 1 and 23 and being mounted within the extension tongues 9 of the peripheral flange 8 of the plate 1, the end 10 of the upper tongue 9 engaging over the front of the glass 28 to prevent the same from falling out of the frame. The number supporting frame thus assembled may then be arranged within any suitable casing for fastening the same upon a vehicle.

In Figures 1-4 inclusive I have shown the number supporting frame as mounted within a tail light casing, the tongues 9 being secured to the tail light casing 29 by means of bolts or other suitable fastening members 30. A closure ring 31 is then fitted over the front of the tail light casing 29 and secured thereto by means of the screws 32, the said closure ring 31 having an inturned flange 33 which engages the front glass 28 to prevent the same from being displaced from the number supporting frame. Any conventional means may be utilized for illuminating the tail light, such as the electric bulb 34. With the number supporting plate thus arranged within the tail light casing 29 it will be noted that the numbers will be clearly visible both in the day time and at night, the electric bulb 34 clearly illuminating the numbers at night and also illuminating the red glass 12 so as to serve as the conventional tail light.

The number plate 14 is thus rigidly mounted between the frame plates 1 and 23 and encased between the front and rear glasses 28 and 13 so as to be protected from injury and dirt. When it is desired to change the year designation member 21 it is merely necessary to remove the closure ring 31 and the front glass 28, after which the screws 25 can be easily removed with a screw driver and the section 24 of the front frame plate 23 removed. The year designation number 21 can then be slipped out of the notches 22 through the opening in the plate 23 left by the removal of the section 24 thereof. To ensure the insertion of an authorized year designation number member 21, the said members are preferably inscribed with the full license number, as at 20$^a$. It will thus be seen that if a year designation member bears a number other than the license number in the frame the driver of the car will be quickly placed under suspicion. In order to remove the detachable section of the license number it is necessary in addition to removing the closure ring 31 and front glass 28, to remove all of the bolts 26 and the front frame plate 23, this of course necessitating the complete removal of the number supporting frame from the tail light casing in order to remove the nuts from the bolts 26 which are arranged at the rear of the number supporting frame. The time thus consumed in so disassembling the number supporting frame would be substantially a positive preventive of any unauthorized person changing the license number. It will further be noted that, in view of my identification of the various sections of the license number, if a section of another number were used with one section of the authorized number detection of the unauthorized use of the number would be easily accomplished. Thus it would be practically impossible for a thief to successfully dispose of a vehicle equipped with a license sign embodying my invention, as is possible at the present time by a mere changing of the license number plate, due to the difficulty of changing the numbers and the practical impossibility of making the sections of the numbers correspond. The license number section identification means 16ª, 16ᵇ and 16ᶜ may be applied to the respective number sections in any suitable way, but in the present instance these identifications are stamped or stenciled out of the respective number sections, and the frame plates 1 and 23 are provided with openings 37 and 23ª through which the light from the lamp bulb 34 may shine to illuminate the said identifications.

Figures 12, 13:
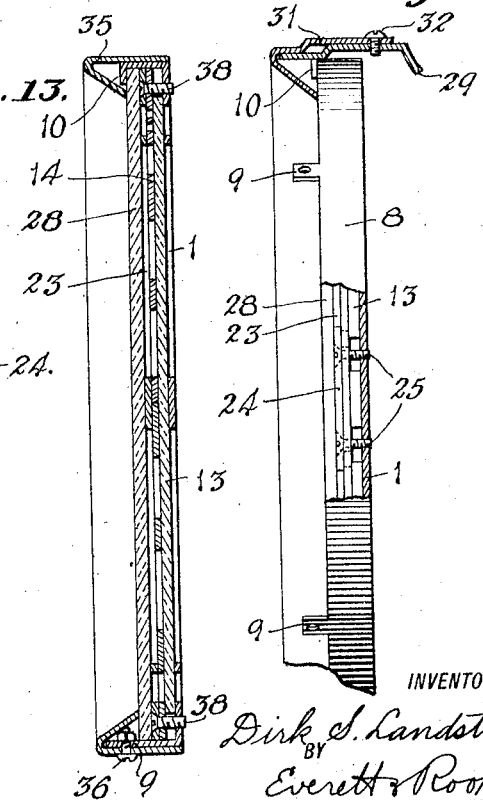
Figure 12 is an enlarged side elevation of the number supporting frame, the tail light casing being shown in section and portions of the number supporting frame being also shown in section.
Figure 13 is a transverse vertical sectional view through a modified form of my invention.

My license number sign may be utilized without a tail light, and such a construction is shown in Figure 13 of the drawing. In this construction the license number frame is of substantially the same construction as that above described, and the closure ring 35 is secured directly to the license number frame by means of the screws 36 which are fastened to the extension tongues 9 of the license number frame in substantially the same way that the said tongues are secured to the tail light casing 29, as shown in Figure 3. It will be noted that the license numbers can be easily read owing to the transparency of the glasses 28 and 13, even when the license number frame is used without the tail light. In this form of the invention screws 38 may be substituted for the bolts 26, the screws being removable with a screw driver only after the front glass 28 has been removed. The formation of the license number in sections, in addition to rendering the unauthorized change of the number more difficult, also enables the number plate bearing the permanent section of the number to be used with numerous removable sections by merely inserting the proper identification means 16ª to correspond with the removable section to be used. The removable section may similarly be used with numerous number plates by a proper insertion of the identification means 16ᵇ.

While I have shown and described a few possible embodiments of my invention, it will be obvious that many modifications and changes can be made in the detail construction thereof by those skilled in the art without departing from the spirit or scope of the invention, and I do not wish to be understood as limiting myself except as required by the following claims when construed in the light of the prior art.

Having thus described the invention what I claim is:

1. A vehicle license sign including a frame plate having an opening therein, an indicia plate formed with an opening registering with and slightly larger than the opening in said frame plate, indicia removably fitted in said opening in said indicia plate, a second frame plate mounted over said indicia plate formed with an opening corresponding to the opening in the first mentioned frame plate and overlying the edges of said removable indicia, and means for fastening said frame plates together to hold said removable indicia against displacement.

2. A vehicle license sign including a frame, a number plate mounted in one side thereof, fastening members for securing said plate in said frame and projecting through said frame and operable from one side thereof, a closure plate on the opposite side of said frame, a casing having one side thereof open, and means for mounting said frame in the casing with the first mentioned side innermost.

3. A vehicle license sign including a number plate having removable indicia thereon, a supporting frame for said number plate having an opening adjacent said removable indicia through which said indicia may be removed and replaced, and means for normally closing said opening.

4. A vehicle license sign including a number plate having removable indicia thereon, a supporting frame for said number plate having a plate overlying said number plate, said frame plate having an opening registering with said removable indicia through which said indicia may be removed and replaced, and means for normally closing said opening to hold said indicia in place in said frame.

5. A vehicle license sign including a frame, a number plate mounted in one side thereof, fastening members for securing said plate in said frame and projecting through one side of said frame, and a closure plate on the opposite side of said frame.

6. A vehicle license sign including a frame plate, a number plate mounted on said frame plate, a second frame plate mounted on said number plate, and a plurality of fastening bolts connecting said frame plates, the heads of said bolts being countersunk in one of said frame plates whereby the bolts are accessible for operation only at the opposite side of said frame.

7. A vehicle license sign including a pair of frame plates, one of which has a removable section, a number plate secured therebetween and having removable indicia thereon adjacent said removable section of one of the frame plates, and fastening members for detachably holding said removable section in position in its frame plate.

8. A vehicle license sign including a pair of frame plates, one of which has a removable section, a number plate secured therebetween and having removable indicia thereon adjacent said removable section of one of the frame plates, fastening members for detachably holding said removable section in position in its frame plate, and a closure plate arranged over said frame plate and normally rendering said fastening members inaccessible.

9. A vehicle license sign including a frame plate having a plurality of openings therein, an indicia plate formed with a plurality of openings corresponding to the openings in said frame plate and having indicia arranged therein, a second frame plate mounted over said plate and formed with openings registering with said openings in the first mentioned frame plate, fastening members passing through both said frame plates to secure all said plates together, a transparent closure plate arranged over said second mentioned frame plate and covering said fastening members to prevent removal thereof, and means for securing said closure plate to said frame.

10. A vehicle license sign including a casing having an open side, a number supporting frame, means for securing said frame in said open side of said casing, a closure plate arranged over said number supporting frame, and a closure ring secured to said casing and overlying the edges of said closure plate and covering said fastening means securing said frame in the casing.

DIRK S. LANDSTRA.